Jan. 28, 1930.　　　　　O. W. FRY　　　　　1,745,088
MOTOR VEHICLE RUNNING GEAR
Filed April 30, 1928
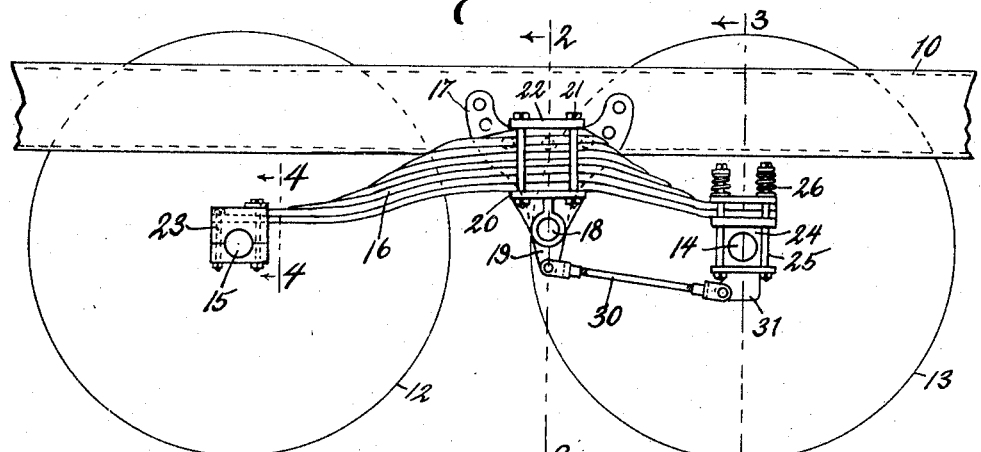
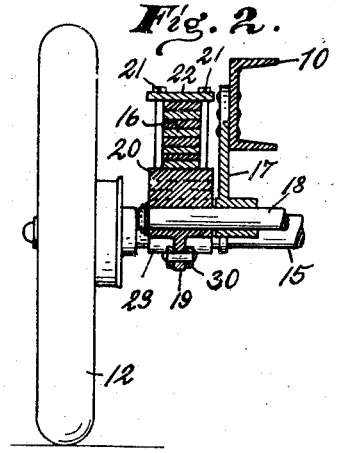
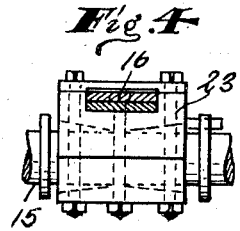
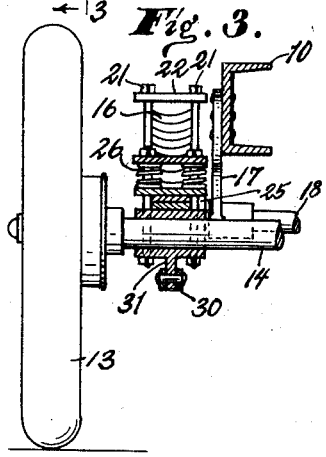
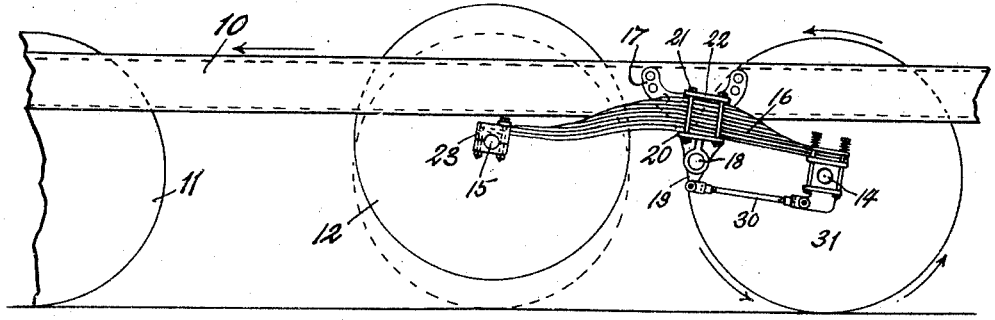
Inventor
Orlander W. Fry.
by
Lockwood & Lockwood
His Attorneys.

Patented Jan. 28, 1930

1,745,088

UNITED STATES PATENT OFFICE

ORLANDER W. FRY, OF LOS ANGELES, CALIFORNIA, ASSIGNOR TO O. R. FULLER CO., OF LOS ANGELES, CALIFORNIA, A CORPORATION

MOTOR-VEHICLE RUNNING GEAR

Application filed April 30, 1928. Serial No. 273,866.

The object of this invention is to improve the construction and mounting of the two pairs of rear wheels on six-wheel motor vehicles so that the work and operation of said rear wheels will be rendered more efficient, practical and satisfactory than without said invention.

In such motor vehicles the frame is supported on the two pairs of rear wheels by means of upper semi-elliptical leaf side springs pivotally mounted between their ends in connection with the frame, and the ends of said springs mounted on the axles of said wheels; and the rear axle and wheels are the driving axle and wheels.

The chief feature of this invention consists in rigid push rods pivotally connected at their rear ends to the ends of the driving axle by means secured on the driving axle for supporting the ends of the springs, and the forward ends of said push rods being pivotally connected to a downward extension from the bottom of the means for pivotally mounting the middle portion of the springs on a transverse rod that is mounted in connection with the frame for supporting the springs.

The effect of such construction is that the forward push or movement of the rear driving axle acts through said push rods, spring mounting and springs so as to have a tendency to lift the forward ends of the springs and the middle axle and wheels, and thereby to reduce the weight of the load on said middle axle and wheels to an appreciable extent. An effect and advantage of this action is that it correspondingly increases the weight of the load on the rear axle and wheels and thus increases and improves the traction thereof.

The push rods also aid materially in propelling the vehicle in that they cooperate with and are in aid of the springs. Hence this invention will enable the motor vehicle to carry a heavier load than without the invention and to have more traction for the rear wheels and the vehicle will more effectively transport the load on the road and particularly on a bad road.

The full nature of the invention will be understood from the accompanying drawings and following detailed description and claims.

In the drawings:

Fig. 1 is a side elevation of a portion of the frame and rear and middle wheels and the mounting thereof, of a six-wheel motor vehicle, the remainder of the vehicle being omitted and broken away. Fig. 2 is a transverse vertical section on the line 2—2 of Fig. 1, parts being broken away. Fig. 3 is a vertical transverse section of Fig. 1. Fig. 4 is a vertical transverse section of a portion of the construction on the line 4—4 of Fig. 1, parts being shown by dotted lines and parts broken away. Fig. 5 is a side elevation of the frame and three sets of wheels of such vehicle, parts being broken away and parts omitted, and the middle wheel shown in an exaggerated position lifted off the ground by the action of the push rods when the vehicle is loaded and considerable driving power is applied to the driving wheels and axle.

Only a small portion of the entire six-wheel motor vehicle embodying this invention is shown in the drawings. In Fig. 5 there is shown the middle portion of the side bar 10 of the frame of the vehicle and a front wheel 11, a middle wheel 12 and a rear driving wheel 13. The middle and rear driving wheels are rather close together and support the rear portion of the frame and most of the load. The drive wheels 13 are mounted on a driving axle 14 driven by the usual means, not herein shown. The middle wheels 12 are not driving wheels and are mounted on an axle 15. The frame is mounted on a cross rod 18 which is pivotally mounted at each end in a bracket 17 secured to the frame and carried by means of arms or members 19 that are secured to the plate 20 on the underside of an upper semi-elliptical leaf spring by means of the bolts 21 extending through said bottom plate and a top plate 22 for clamping them on the springs near the middle thereof.

The forward ends of the springs 16 are mounted on the axle 15 of the middle wheels 12 by the bearing box construction 23. The bearing box 24 for mounting the rear ends of each spring on the rear driving axle 14 is constructed substantially as shown in Fig. 1. Bolts 25 for securing the spring on the bearing box 24 are yieldingly supported by the spiral springs 26 on their upper ends.

The spring therefore can rock on the cross rod 18 and the chief feature of the invention consists in combining with such a spring so mounted, the push rods 30 in the manner and by the means substantially herein shown. The rear end of each push rod 30 is pivotally connected with an arm 31 secured to and extending down from the bearing box 24 of the driving axle 14. The forward end of the push rod 30 is pivotally mounted on the lower end or downward extension of the arm 19. This arm or member 19 is secured at its upper end to the middle of the spring 16 and intermediate its ends it is pivotally mounted on the cross rod 18 and at its lower end it is pivotally connected with the forward end of the push rod 30.

The construction of both sides of the vehicle frame is substantially the same as shown herein, but preferably the push rods 30 are practically parallel with the rear end portions of the springs 16 and when the vehicle is loaded they are substantially horizontal. Also preferably the driving axle is closer to the middle mounting of the springs than the middle axle 15, in order that the rear wheels will always receive more of the load than the middle wheels and thus their traction effect will be enhanced.

Under the influence of driving action on the rear driving wheels 13 the tendency is to push the driving axle 14 thereof forward in order to propel the vehicle. Such forward movement or thrust of the driving axle 14 is transmitted to the spring 16 and the push rods 30, and since the springs are pivotally mounted on the cross rod 18 so that they can tilt to some extent, such forward movement or thrust of the rear driving axle would have a tendency to rock or tilt not only the rear bearing box 24, but also the arm 19 and the spring 16. If the forward movement of the vehicle be resisted, say by a stone wall, the effect of such action would tend to bring the forward ends of the springs and middle wheels into the position shown in Fig. 5.

However, in ordinary travel the middle wheels would not be lifted off the ground and it is not contemplated that they should be, but one object of the invention is to reduce the load on the middle wheels and correspondingly increase the load on the driving wheels in order to gain thereby an additional traction effect. This is one function of the push rods 30. Another function is their aid in propelling the vehicle. Since the push rods 30 are rigid they will transmit an enormous starting thrust, much greater than the spring 16. But while travelling, after the start, the work of the push rods is slight. The effect of these functions of the push rods 30 is to enable the vehicle to transport a heavier load than if the push rods were not employed and to enable the vehicle to satisfactorily travel with a load much better over a bad road than if there were no push rods.

I claim as my invention:

1. A motor vehicle having a frame, a driving axle and wheels, a parallel axle and idler wheels in front of the driving axle, a semi-elliptical spring above the axles and mounted between its ends in connection with the frame at each side thereof so it can rock vertically and with its ends supported and mounted on said axles by suitable bearings, and a push rod below the rear half of each spring which is pivoted at its rear end to the lower part of the bearing of the spring on the driving axle and at its forward end pivotally connected with the underside of the spring near its pivotal connection with the frame, whereby said push rods transmit the forward thrust of the driving axle to the body and front ends of the spring so as to tend to lift the front ends of the spring and front axle and wheels, substantially as set forth.

2. A motor vehicle having a frame, a driving axle and wheels, a parallel axle and idler wheels in front of the driving axle, a semi-elliptical spring above the axles and mounted between its ends in connection with the frame at each side thereof so it can rock vertically and with its ends supported and mounted on said axles by suitable bearings, a downward extension on the spring bearing at each end of the driving shaft, a downward extension from each spring near the pivotal connection of the spring with the frame, and a thrust rod below the rear end of each spring and pivotally connected with the downward extensions from the said bearings and springs, whereby when power is applied to said driving shaft it will tend to lift the front ends of said springs and front axle, substantially as and for the purpose set forth.

3. A motor vehicle having a frame, a driving axle and wheels, a parallel axle and idler wheels in front of the driving axle, a cross rod mounted in connection with the frame between and parallel with said axles and in a plane above said axle, a semi-elliptical spring at each side of the frame and pivotally mounted between its ends on said cross rod and the ends of the spring mounted on said axles by suitable bearings, an extension secured to each spring near the pivotal mounting thereof and extending below said cross rod, and a push rod pivotally connecting the spring bearing on each end of the driving shaft with said spring extension below the pivotal point thereof, whereby said push rod will tend to lift the front axle when power is applied to said driving axle, substantially as set forth.

4. A motor vehicle having a frame, a driving axle and wheels, a parallel axle and wheels in front of the driving axle, a semi-elliptical spring above the axles and mounted between its ends in connection with the frame at each side thereof so it can rock vertically and with its ends supported and mounted on said axles by suitable bearings, a downward extension for each spring near the pivotal connection of the spring with the frame, and a push rod below the rear half of each spring which at its rear is pivotally mounted with the rear driving axle and at its forward end is pivotally connected to said downward extension from the spring and below the pivotal connection of the spring with the frame.

In witness whereof, I have hereunto affixed my signature.

ORLANDER W. FRY.